252. COMPOSITIONS,
97

United States Patent Office.

EVERETTE R. BREED, OF FARMINGTON, ILLINOIS.

Letters Patent No. 95,312, dated September 28, 1869.

IMPROVED SOAP OR DETERGENT-COMPOUND.

The Schedule referred to in these Letters Patent and making part of the same.

To all whom it may concern:

Be it known that I, EVERETTE R. BREED, of Farmington, in the county of Fulton, and in the State of Illinois, have invented a new and improved chemical compound, to be known as "Magic Cleansing-Cream," and to be used as a renovator and grease-extractor; and do hereby declare that the following is a full, clear, and exact description of the ingredients forming the compound, the quantities of each, and the manner of compounding, making, and using the same, premising that the nature of my invention consists in a detergent composition, which can be made either hard or of a semi-hard consistency, for the purpose of removing grease, paint-spots, oil, &c., from woollens, silks, clothing, carpets, dirt from glass or wood-work, as well as for washing fine fabrics, for toilet and shaving, and for household-purposes generally, and without injury to the finest fabric, material, or skin.

To enable others to make and use my invention, I will proceed to describe the manner of preparing and compounding it.

Into any vat or boiler with fire beneath, similar to those used by soap-makers, with capacity enough to allow the paste to rise, according to the quantity to be manufactured, I put three (3) gallons of soft water, and heat the same to two hundred and twelve (212) degrees Fahrenheit, and having previously made some tallow-soap, by what is commonly known as the "cold process," take three pounds of the same, or use any of the common hard soaps, and slice the same into thin pieces or shavings, put them into the vat with the water, and when well dissolved, add four (4) ounces of sal-soda, in solution, then add two (2) ounces of beef's gall, one (1) ounce of aqua ammonia, one (1) ounce of nitrate of potassa, in solution, one (1) ounce of alcohol, one (1) ounce of glycerine, one (1) ounce of borax, in solution, and boil ten (10) minutes. Then add one (1) ounce of annotto, in solution, and one-half pound weight of dry pulverized sal-soda, when cooled to one hundred and four (104) degrees Fahrenheit. Add also one-half ounce of oil of sassafras and one-fourth of an ounce of oil citronella, or any other perfumes, and draw off the whole into a cooler. When cold, it is ready for use.

To use this composition to remove spots, &c., a rag or sponge may be applied, saturated with a lather of water and this composition in solution, or the fabric may be washed in water, rubbing it with the composition. In fact, it may be used as soap, with water, for washing or cleansing, or in removing grease, paint-spots, &c. In the latter cases a much stronger lather, of course, must be used.

Having thus fully described my invention,

What I claim as new, and desire to secure by Letters Patent, is—

The chemical composition, or detergent soap, prepared and compounded, and to be used, substantially as described, or of ingredients substantially the same, and which will produce the required result.

In testimony that I claim the foregoing, I have hereunto set my hand, this 24th day of August, 1869.

EVERETTE R. BREED.

Witnesses:
   HENRY W. WELLS,
   ALLEN S. SWEET.